US007671786B2

(12) United States Patent
Jain et al.

(10) Patent No.: US 7,671,786 B2
(45) Date of Patent: Mar. 2, 2010

(54) METHOD AND APPARATUS FOR REPRESENTING AND CLASSIFYING MICROWAVE BACK-PROJECTION RADAR SIGNALS

(75) Inventors: Ankur Jain, Woburn, MA (US); Daniel N. Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 111 days.

(21) Appl. No.: 12/118,079

(22) Filed: May 9, 2008

(65) Prior Publication Data

US 2009/0278726 A1 Nov. 12, 2009

(51) Int. Cl.
*G01S 13/50* (2006.01)

(52) U.S. Cl. .......................... 342/28; 342/160
(58) Field of Classification Search .............. 342/28
See application file for complete search history.

(56) References Cited

U.S. PATENT DOCUMENTS

| | | | | |
|---|---|---|---|---|
| 4,328,487 A | * | 5/1982 | Cheal | 340/554 |
| 4,595,924 A | * | 6/1986 | Gehman | 342/28 |
| 6,633,254 B1 | * | 10/2003 | Sutphin | 342/28 |
| 6,894,639 B1 | * | 5/2005 | Katz | 342/90 |
| 6,897,802 B1 | * | 5/2005 | Daniell et al. | 342/90 |
| 6,937,185 B1 | * | 8/2005 | Collazo et al. | 342/159 |
| 7,592,944 B2 | * | 9/2009 | Fullerton et al. | 342/57 |
| 2004/0119633 A1 | * | 6/2004 | Oswald et al. | 342/70 |
| 2006/0284761 A1 | * | 12/2006 | Picard | 342/160 |
| 2009/0020002 A1 | * | 1/2009 | Williams et al. | 89/41.03 |

OTHER PUBLICATIONS

Radar Tutorial.eu website. "Sliding Window". <http://web.archive.org/web/20071106233405/http://www.radartutorial.eu/10.processing/sp11.en.html> Nov. 6, 2007. Accessed Oct. 21, 2009.*
Inomata et al., "Microwave back-projection radar for wide-area surveillance system," 34th European Microwave Conference, 2004. vol. 3, Issue, 11-15, pp. 1425-1428, Oct. 2004.
Scholkopf et al., "Kernel principal component analysis," Advances in Kernel Methods—Support Vector Learning, pp. 327-352. MIT Press, Cambridge, MA, 1999.

* cited by examiner

*Primary Examiner*—Thomas H Tarcza
*Assistant Examiner*—Matthew M Barker
(74) *Attorney, Agent, or Firm*—Gene Vinokur; Dirk Brinkman

(57) ABSTRACT

A moving object is classified by transmitting, by a linear array of transmit antenna elements, a microwave into a surveillance area. A scattered microwave backprojected from a moving object is received by a linear array of receive antenna elements. Features are extracted from the scattered microwave related to a spiral evolution of the scattered microwave. The moving object is then classified as one of a set of possible classes according to the extracted features, and an alarm signal can be generated indicating the selected class.

16 Claims, 3 Drawing Sheets

METHOD AND APPARATUS FOR REPRESENTING AND CLASSIFYING MICROWAVE BACK-PROJECTION RADAR SIGNALS

FIELD OF THE INVENTION

This invention relates generally to microwave back-projection radar, and more particularly to using microwave back-projection radar for surveillance.

BACKGROUND OF THE INVENTION

Sensors, e.g., infrared sensors and cameras, are most frequently used for surveillance. Infrared sensors are relatively cheap. However, infrared sensors can only detect binary events, i.e., whether there is an intrusion or not. Cameras are relatively expensive, and based surveillance system become complex when it is desired to identify and classify objects in their field of view.

In both cases, the detection area is limited by a relatively small field of view, and therefore a large number of sensors must be used for wide-area surveillance.

Microwave back-projection can also be used for wide-area surveillance. Microwaves are electromagnetic (EM) waves with wavelengths shorter than one meter and longer than one millimeter, or frequencies between 300 megahertz and 300 gigahertz. (UHF, SHF, EHF).

An incident microwave is transmitted by a transmitting antenna array, which is a "leaky" coaxial cable. The leaky coaxial cable has slots punched into the outer conductor sheath that radiate the microwave, which is received by a receiver antenna array that is also a leaky coaxial cable with slots.

A moving object "scatters" the received signal, see Inomata et al., "Microwave back-projection radar for wide-area surveillance system," 34th European Microwave Conference, 2004. Volume 3, Issue, 11-15, pages 1425-1428, October 2004, incorporated herein by reference. They used a spread spectrum technique that combines IQ demodulation with complex FFT to obtain a two-dimensional space representation of the scattered wave. The spread of the microwave in this space was used to detect intruders. However, because their technique only analyzes the overall level of the electromagnetic field, they can only detect binary intrusion events, like an infrared sensor. That is, they cannot distinguish the kind of intruder (human, vehicle, animal, etc.) that entered the observed space.

SUMMARY OF THE INVENTION

A receiver acquires a microwave scattered by a moving object in the complex space. Signal features are extracted. The features are classified to determine a class for the moving object. Then, an alarm signal can be generated according to the class of the moving object.

DETAILED DESCRIPTION OF THE PREFERRED EMBODIMENT

Figure 1:
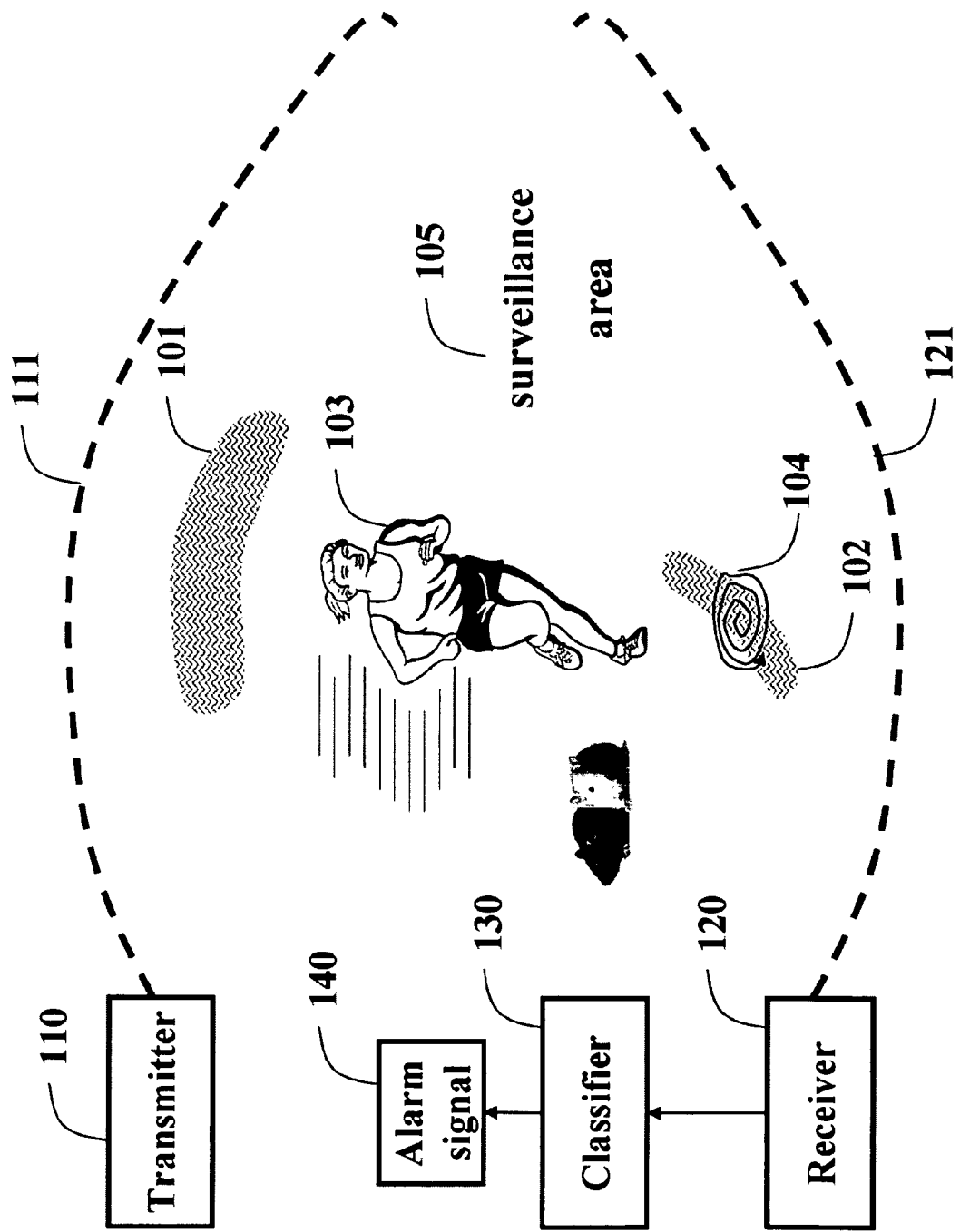
FIG. 1 is a block diagram of a surveillance system according to an embodiment of the invention.

FIG. 1 shows a microwave back-projection radar system according to an embodiment of our invention. The system includes a transmitter 110 and a receiver 120. The transmitter and receiver are connected to "leaky" coaxial cables 111 and 121, respectively. The coaxial cables act as a transceiver antenna array. The cables can be arranged at a perimeter of an area 105 to be placed under surveillance.

The first cable 111 transmits an incident microwave 101, and the second cable 121 receives 120 a microwave 102 scattered by a moving object 103 between the two cables. The scattered microwave 102 is classified 130 as described below by extracting features from the received microwave. Depending on the classification, an alarm signal 140 can be generated identifying the moving object as, e.g., a man or a mouse. It should be noted that multiple different objects can be detected and classified concurrently.

The presence of the object is indicated by a measured displacement 104 in the received microwave. When the object 103 is moving, the representation of the received microwave signal in the complex space translates and rotates. That is, its phase changes proportionally to the movement of the object and the phase moves away from its "no-motion" position in the complex space. This generates the spiral displacement 104. Therefore, the features that we extract relate to the spiral evolution 104 of the scattered microwave. The features that we extract can be based on curvilinear distances (CURVD) or kernel principal component analysis (KPCA) of the spiral evolution.

It should be noted, that Inomata et al. do not extract spiral based features, and do not classify moving objects.

The displacement measurements can then be used by any classifier, such as support vector machines (SVM), k-nearest neighbor (k-NN), or a naïve Bayes classifier to classify an object scattering the microwave. A naïve Bayes classifier is a simple probabilistic classifier based on applying Bayes' theorem with strong (naïve) independence assumptions. We also describe a sorted naïve Bayes classifier (SNBC), which can effectively classify the type the object without being affected by a position of the object along the receiving antenna array 121.

Figure 2:
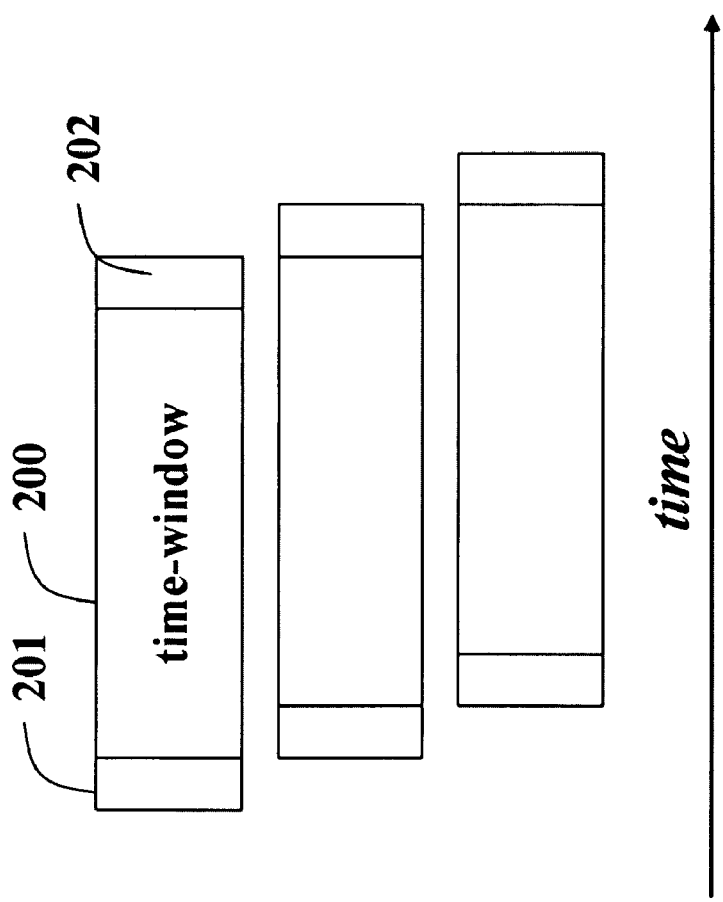
FIG. 2 is a block diagram of a sliding time-window used by the invention.

As shown in FIG. 2, we use a sliding time-window 200. The window can be fixed or variable, depending dynamic conditions in the surveillance area, or the detecting precision desired. A size of the sliding window is N samples $x_1, x_2, \ldots x_N$, where $x_1$ is the first sample 201, and $x_N$ the last sample 202 in the window. For each next sample, the first is sample is discarded, and the next sample becomes the last sample.

Curvilinear Distance (CURVD)

In one embodiment, the features to be classified are total curvilinear distance traversed as a result of scattering and is expressed as $$CURVD = \sum_{i=2}^{N} (x_{i-1} - x_i)^2.$$

Because the samples are generated and analyzed continuously, the CURVD features can be efficiently updated as new samples are received. $CURVD_{old}$ is the current distance measure over the contents of the sliding window of size N. To include the last sample $x_{new}$ into the sliding window, the first sample $x_1$ is discarded. The new curvilinear distance $CURVD_{new}$ is $$CURVD_{new} = CURVD_{old} + (x_N - x_{new})^2 - (x_1 - x_2)^2$$

After a new curvilinear distance is obtained, $x_1$ is discarded. This makes $x_2$ the first sample in the window, and sample $x_{new}$ is inserted as the last sample in the sliding time-window.

Kernel Principal Component Analysis (KPCA)

In another embodiment, the features are eigen-values obtained by a linear eigen-value analysis given a measure of the displacement of the samples along a rectangular axis. However as we described above, the axis of displacement is along a spiral. To measure the displacement along a curvilinear axis, we use the eigen-values from a kernel principal component analysis (KPCA), see Schölkopf et al., "Kernel principal component analysis," Advances in Kernel Methods—Support Vector Learning, pages 327-352. MIT Press, Cambridge, Mass., 1999, incorporated herein by reference.

KPCA is a method of non-linear feature extraction. The eigen-values obtained using the KPCA yield a more accurate measure of displacement along the curvilinear axis.

An input sample set is $\{\vec{x} \in \Re^n\}$, for $x_1$ to $x_N$. The distribution of the samples is along a non-linear axis. The samples can be linearized by non-linearly mapping the samples to a feature space $\Phi(\vec{x}) \in F$. The mapping $\Phi$ is defined implicitly, by specifying the form of the dot product in the feature space. So, for an arbitrary pair of mapped samples $\vec{x}$ and $\vec{y}$, the dot product is defined in terms of some kernel function. Thus, $$\Phi(\vec{x}) \bullet \Phi(\vec{y}) = K(\vec{x}, \vec{y}).$$

An example of a common kernel is the Gaussian kernel $$K(\vec{x}, \vec{y}) = \exp\left(-\frac{\|\vec{x} - \vec{y}\|}{2\sigma^2}\right),$$

where $\sigma^2$ is the bandwidth of the Gaussian kernel.

In this embodiment, we used the highest eigen-value of the kernel matrix K, as the measure of the spread of the data. Given the samples in the sliding time-window, the N×N kernel matrix K is $$K_{ij} = \phi(x_i) \cdot \phi(x_j) = \kappa(x_i, x_j),$$

where i and j index the sample pairs. An appropriate kernel function and its parameter can be selected according to characteristics of the samples.

Sorted Naïve Bayes Classifier (SNBC)

In one embodiment, we use the SNBC. The SNBC is a simple probabilistic classifier based on applying Bayes' theorem with strong feature-independence assumptions. One can work with the naïve Bayes model without using any Bayesian methods. In spite of the naïve design and over-simplified assumptions, naïve Bayes classifiers often work much better in many complex real-world applications, such as surveillance, than one might expect. An advantage of the SNBC is that it requires only a small amount of training samples to estimate the parameters, i.e., means and variances of the features, necessary for classification. Because the features are assumed to be independent given the class, only the variances of the features for each class need to be determined, and not the entire covariance matrix.

Abstractly, the probability model for a classifier is a conditional model $$p(C|F_1, \ldots, F_n)$$

over a dependent class variable C conditional on several features $F_1$ through $F_n$. Using Bayes theorem, we obtain $$p(C|F_1, \ldots, F_n) = \frac{p(C)p(F_1, \ldots, F_n|C)}{p(F_1, \ldots, F_n)}.$$

Applying the independence assumption, we have $$p(C|F_1, \ldots, F_n) = \frac{1}{Z} p(C) \prod_{i=1}^{n} p(F_i|C).$$

Since Z is a constant, we can ignore it and for a two class problem Class 1 ($C_1$) and Class 2 ($C_2$), given a testing sample set X with features $F_1, F_2 \ldots, F_n$ a probability of the sample set X belonging to class 1 is $$p(C_1|F_1, F_2, \ldots, F_n) = p(C_1) \Pi p(F_i|C_1).$$

In the above representation, the feature values $F_i$ are the measure of the displacement of the scattered microwave 121, which can be obtained using the KPCA or the CURVD method as described above. In general, the higher this measure is at a particular element of the receiver antenna array, the higher is the probability of the object near the location of the element. Thus, the presence of an intruding object generates a waveform like signature as the object moves along the receiver array. The peak of this waveform occurs at the receiver array element that is closest the intruder. This would generate different shapes of waveform for the same class of intruder located at different positions along the receiver antenna array. This can confuse the conventional naïve Bayes classifier.

Therefore, we 'scrambled' the input signal by sorting it based on the signal values. This way, all signal values are represented in a canonical form where the first feature is always a maximum displacement value. The sorted features can be used in the above described formulation to classify the intruder type.

Figure 3:
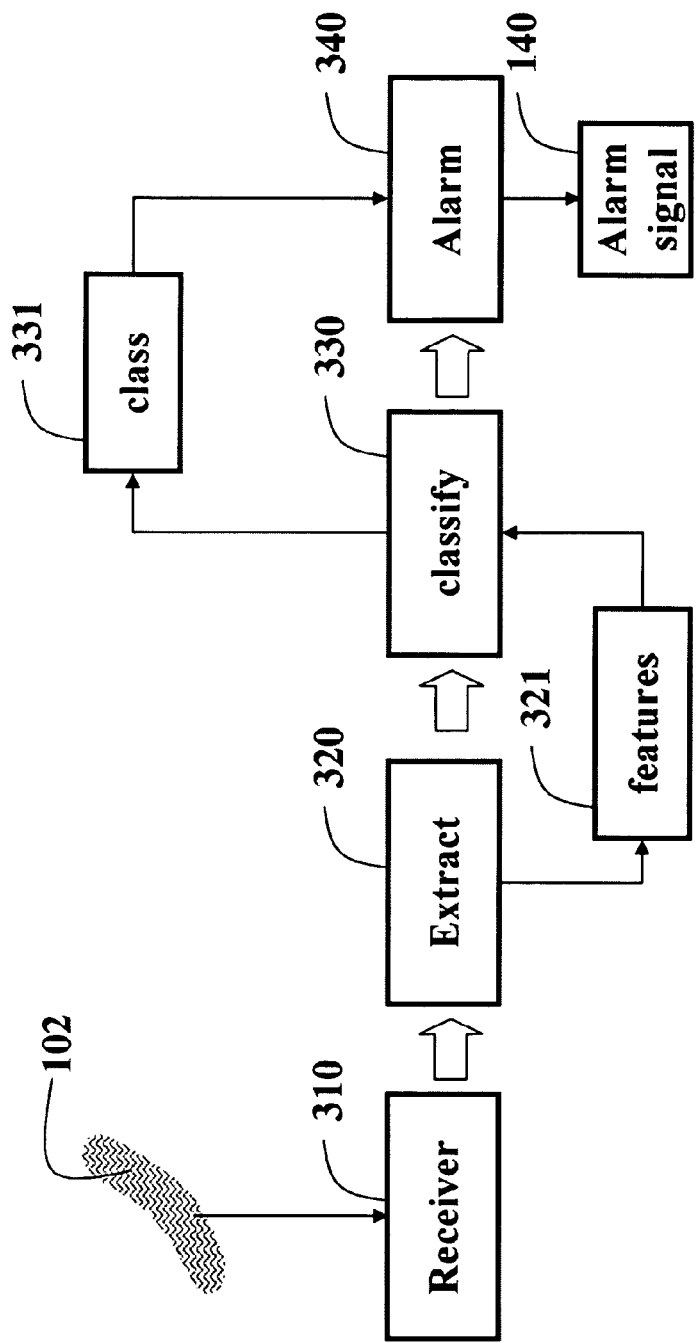
FIG. 3 is a flow diagram of a surveillance method according to an embodiment of the invention.

FIG. 3 shows the system and method according to our invention. The receiver acquires 310 the scattered microwave 102. Features 321 are extracted 320. The features are classified 330 to determine a class 331 for the moving object. Then, an alarm signal 140 can indicate the class.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for classifying a moving object using microwaves, comprising:

transmitting, by a linear array of transmit antenna elements, a microwave into a surveillance area;

receiving, by a linear array of receive antenna elements, a scattered microwave backprojected from a moving object;

extracting features from the scattered microwave related to a spiral evolution of the scattered microwave, in which the features are extracted using a sliding time-window, in which the sliding window includes N samples $x_1$, $x_2, \ldots, x_N$, where $x_1$ is a first sample, and $X_N$ is a last sample for any instance in time, and in which the features are a total curvilinear distance traversed as a result of the scattered microwave, expressed as $$CURVD = \sum_{i=2}^{N} (x_{i-1} - x_i)^2;$$

classifying the moving object as one selected class of a set of possible classes according to the extracted features; and generating an alarm signal indicative of the one selected class.

2. The method of claim 1, in which the possible classes includes people, vehicles and animals.

3. The method of claim 1, in which the linear array of transmit antenna elements and the linear array of receive antenna elements are in a form of leaky coaxial cables having slots punched into an outer conductor sheath, and further comprising:

arranging the linear array of transmit antenna elements and the linear array of receive antenna elements at a perimeter of the surveillance area.

4. The method of claim 1, further comprising:
classifying multiple different objects concurrently.

5. The method of claim 1, in which the features measure a displacement of the scattered microwave.

6. The method of claim 1, in which the moving object causes a complex signal received by each element of the linear array of receive antennas elements to rotate and translate generating the spiral evolution.

7. The method of claim 1, in which the sliding time-window is fixed.

8. The method of claim 1, in which the sliding time-window is variable.

9. The method of claim 1, in a new curvilinear distance $CURVD_{new}$ based on an old curvilinear distance $CURVD_{old}$ is $CURVD_{new} = CURVD_{old} + (x_N - x_{new})^2 - (x_1 - x_2)^2$.

10. The method of claim 1, in which the features are eigenvalues obtained by a linear eigen-value analysis.

11. The method of claim 1, in which the classifying uses a support vector machine.

12. The method of claim 1, in which the classifying uses a k-nearest neighbor classifier.

13. The method of claim 1, in which the classifying uses a naïve Bayes classifier.

14. The method of claim 1, in which the classifying uses a sorted signal naïve Bayes classifier.

15. The method of claim 14, further comprising:
sorting input samples of the scattered microwave according to signal values before extracting the features.

16. An apparatus for classifying a moving object using microwaves, comprising:

a linear array of transmit antenna elements configured to transmit a microwave into a surveillance area;

a linear array of receive transmit antenna elements configured to acquire a scattered microwave backprojected from a moving object;

microwave related to a spiral evolution of the scattered microwave;

means for extracting features from the scattered microwave related to a spiral evolution of the scattered microwave, in which the features are extracted using a sliding time-window, in which the sliding window includes N samples $x_1, x_2, \ldots, x_N$, where $x_1$ is a first sample, and $X_N$ is a last sample for any instance in time, and in which the features are a total curvilinear distance traversed as a result of the scattered microwave, expressed as $$CURVD = \sum_{i=2}^{N} (x_{i-1} - x_i)^2.$$

a classifier configured to classify the moving object as one selected class of a set of possible classes according to the extracted features; and an alarm signal indicating the one selected class.

* * * * *